Figure 2:
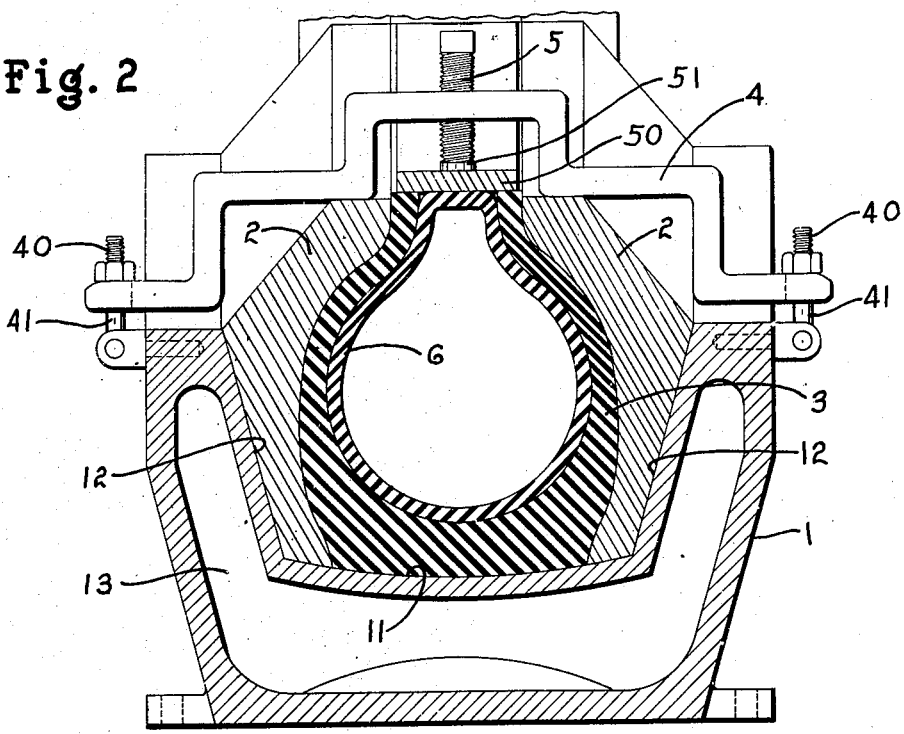

June 24, 1941.    J. R. RICHARDS    2,246,860
TIRE PATCH MOLD
Filed June 4, 1938

James R. Richards, Inventor

By Charles L. Reynolds, Attorney

Patented June 24, 1941

2,246,860

UNITED STATES PATENT OFFICE 2,246,860

TIRE PATCH MOLD

James R. Richards, Seattle, Wash.

Application June 4, 1938, Serial No. 211,858

4 Claims. (Cl. 18—18)

My invention relates to tire patch or section molds. Such molds are employed in the making of repairs to a restricted portion of the tread or side walls of a tire casing (usually involving the side walls), the broken spot being carefully repaired by application of fabric, if necessary, and of overlying rubber, and the patch mold being employed to vulcanize all parts and the adjoining rubber into proper place and relationship. Obviously such molds are applied to only a segment of a tire.

Molds commercially used for such a purpose are usually one or the other of two types. One type, not so generally used as the other type, because of its greater cost and because it is not so simple and easy to handle as the other type, is represented in the patent to Woock et al., No. 1,928,404. Here two complemental jaws or side plates, each with a liner conforming precisely to the contour of half the tread and a greater or lesser portion of the side wall towards the bead, are separable along a plane dividing the casing in half, and are compressible upon a tire and patch which are to be vulcanized by screw means or the like, effecting movement at right angles to the plane of division. The cost of such molds, which usually require different jaws for each different size of tire casing, and their relative complexity and slower operation, prohibits their general use, even though they do a good, workmanlike job, of good appearance.

The more commonly used type, common because of its simplicity, ease of operation, adaptability to varying sizes of tires, and low cost, is represented in the Wohlgemuth patent, No. 1,317,850. Section molds of this type are of one piece, and have a cavity or channel the side walls whereof are shaped and spaced apart just sufficiently that they approximately fit the tire tread and the side walls as far as the greatest width of the casing. It would be desirable, of course, if they could fit the entire side wall, to and including the bead, as do those of the Woock et al. type, but since the walls of the cavity are not separable as in Woock's mold, to close upon and compress the tire from all sides, the tire must instead be moved downwardly towards the bottom of the cavity, hence the side walls of the mold must be spaced apart as much as the greatest width of the tire section. This greatest width occurs midway between the tread and the bead, and the tire's side walls converge toward the bead, hence the side walls of the mold can not, themselves, engage the tire's side walls in the bead portion. To effect such engagement bead plates are used, inserted between the walls of the mold and the inwardly converging side walls of the tire.

Such bead plates offer always the possibility of improper placement of one or the other, as a result of careless workmanship, with resultant improper fitting and unbalance of the tire—a serious factor at high speeds—but, what is more important, at least to the purchaser of such tires or patching services, and hence by reflection to the operator of such a mold, these bead plates invariably left irregularities and rough spots on the tire at the most noticeable place—at the greatest width of the tire. This could not be removed satisfactorily, and gave immediate evidence that the tire had been patched. It was therefore undesirable, and, however serviceable it might be, detracted from the commercial value of the job, much as a noticeable, even though serviceable, patch on a suit of clothes would detract from the value of the suit.

The reason for such marks lay in the practical impossibility of merging the curving inside surface of the bead plate, without a break, into the planar surface of the mold's wall, and in the impossibility of locating the bead plates always properly within the mold. In the first place, it is not practically nor economically possible to shape the edge of the bead plate so sharply that no noticeable change in contour will occur. In the second place, were the latter possible, the bead plate's edge could not be kept thus sharp, under the exigencies of commercial operation. Nicks in the edge are soon present, or the edge is burred or curved aside, and the flat face of the bead plate does not seat flat against the flat face of the mold wall; every such failure, and every nick, produces a noticeable rough spot on the repaired tire's side wall, or displaces otherwise the smooth walls of the mold and the bead plate, to form a ridge or rough band along the tire's side wall. In the third place, where an extra plate must be fitted in place, it will occasionally, or even frequently, become cocked or go askew, for there is nothing to fix it definitely in position, as it is forced into place, and the appearance of the finished job is spoiled.

As a variation of the second type, and purely for economical reasons—that is, to enable one fixed cavity to fit varying sizes of tire—the molds are made wide enough for a large size tire, and if it is desired to repair in it a smaller size of tire, the mold's width is reduced by the use of one or more filler plates, which are purely shims or liners, the purpose and effect of which is to shift the mold's walls inwardly. Such an arrangement is shown in the Heintz patent, No. 1,875,727. Always the filler plate is inserted, when a small size tire is to be vulcanized, the tire is then inserted as before, and always the bead plate is used as before, with the same results.

The result is that the vulcanized face of the side wall of the tire casing is rough and irregular, sometimes flattened in appearance, and there is a noticeable break in the curvature and contour of the casing's side wall, as between the original portion and the patched portion, which can be improved but not eliminated by buffing. While this does not in any way detract from the strength and usefulness of the patch, it is seriously objected to by the customer, for the reason that it is conspicuous and attracts attention, and therefore detracts from the neat and pleasing appearance of the tire. The appearance of the tire, especially in the large sections now employed, is a very appreciable factor in the appearance of the automobile as a whole, and any detraction from the appearance of the tire detracts in considerable measure from the appearance of the automobile, and it is because of these factors that customers object to the appearance of a patch tire, yet with such commonly used molds no way has been found to insure neatness and regularity of appearance of a patch or exact conformity of its curves and contours with the curves and contours of the original side wall, and of the adjoining side wall portions of the tire casing.

Each such type, therefore, has its advantages and its disadvantages, and it is the general object of the present invention to provide a tire patch mold which will incorporate the advantages of each such type of mold, and which will eliminate the disadvantages of the two types, and which will therefore provide a better mold than either of the two previously used types.

More specifically it is an object of this invention to provide a tire patch mold which has the advantage of low cost, associated generally with the second type of mold discussed above, and which has also the advantage of conforming very closely, so closely that the patch is practically unnoticeable, to the contours of the side walls of the tire casing, thereby eliminating the roughened or flattened appearance of the usual patch as made by molds of the first type above, eliminating any necessity for a supplemental operation, as buffing, and making patches equal in appearance to those made with the first type of mold discussed above, yet with a mold of far less cost than this first type.

Thus, generally speaking, it is an object of my invention to provide a tire patch mold which is inexpensive, which makes patches which are inconspicuous and pleasing in appearance and to the customer, also to provide such a mold which is simple and rugged in construction and operation.

My invention, therefore, comprises the novel mold and the novel selection and combination of the elements thereof into a new combination, as shown in the accompanying drawing, described in this specification, and as will be more particularly pointed out by the claims which terminate the same.

In the accompanying drawing I have shown my invention embodied in a form which at present is preferred by me, it being understood that various changes may be made, as will be pointed out hereafter, without departing from the spirit of my invention.

Figure 1:
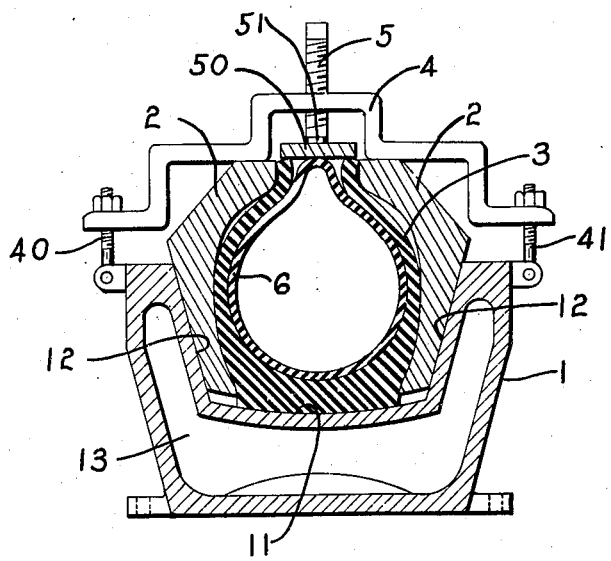

Figure 1 is a transverse section through my mold, showing parts in the position they would occupy before the side plates have been moved to their operative position, and Figure 2 is a similar view showing parts in the final operative position.

Low cost is promoted by making a channel 1 of a single casting of metal, which is strong and heat-conductive, this casting having a bottom 11 shaped to conform to the tread portion of a tire casing, and having sides 12. These sides, rather than being vertical or substantially parallel, are purposely so shaped that they will not fit any tire section, and are preferably inclined upwardly and outwardly from the bottom 11. It is understood, of course, that the channel 1 is curved longitudinally to fit the tread of the tire casing, and usually the channel is provided with means whereby it may be heated. Thus, for instance, it has a chamber 13 within which steam is contained. Other means may be employed to heat the channel, and indeed the primary aim is not to heat the channel itself, but to heat the side plates, later described, which are in direct contact with the side walls of the tire casing, and which in this form are heated by conduction from the channel 1 and conduct heat to the tire casing.

It is intended that such side plates shall be used, not only for small sizes of tire, but for all sizes, and in every instance. These side plates 2 are shaped on their outer faces to conform to the inclined walls 12 of the channel. They are of sufficient height to extend from the bottom 11 of the channel, whereon the tread of the tire casing rests, substantially if not wholly to the bead of the tire casing, and it is particularly to be noted that they are shaped, on their inner faces, to conform to the contour of the side walls of the tire casing from tread to their opposite edge, and that this latter edge is well past the tire's greatest width. It may not be necessary that they extend entirely to the bead, as there is seldom a repair made close to the bead, but normally these plates, and their inner or tire-contacting surfaces, would extend unbrokenly from the tread of the tire casing to the bead. A number of such plates, of varying contour, may be employed for use with different makes of tires, but they are in themselves inexpensive. The outer surface of each conforms to the side wall 12 of the channel, and each inner surface conforms, as above stated, to the entire side wall of the particular size of tire for which it is intended.

The tire casing 3, with the usual air bag 6 within it, of the general shape of the interior of the tire casing, is placed within the channel 1, with the tread of the tire casing resting upon the bottom 11, and with the side plates 2 at either side of the tire casing in contact with its side walls and likewise in contact with the inclined sides 12 of the channel. The spacing of these channel sides is such, with respect to the width of the tire casing and the thickness of the side plates 2, that the side plates will not both readily seat upon the bottom 11, but on the contrary pressure is necessary to force them to such a seat, and to press them inwardly against the side walls of the tire casing in opposition to the expansive force of the air bag. Accordingly some convenient means are provided to force these plates to their seat, and to bring their inner faces into conformity with the contour of the side walls of the tire casing, and to produce inward pressure upon the tire casing. Such means may conveniently take the form of a bridge 4 having an anchor at 40 upon one side of the channel 1, and a similar anchor 41 at the opposite side of the channel, at least one of these anchors being received in a slotted end of the bridge piece, or being otherwise readily disengageable for the swinging aside or removal of the bridge piece 4. The bridge piece 4 may also receive a jack screw 5 swiveled at 51 to a curved plate 50 which in use lies between the separated beads of the tire casing and restrains expansion of the air bag 6 between the tire beads.

As will now be evident, the side plates 2 are forced to a seat by the screw elements which constitute part of the anchoring means 40 and 41, until their lower edges, starting from a position somewhat raised above the bottom 11 of the channel, as in Figure 1, are forced into contact with and seat upon the bottom 11, as in Figure 2. In the latter position they are accurately and definitely fixed in proper position, and the inner face of each plate 2 conforms to the contour of the side walls of the tire casing 3. The jack screw 5 is now screwed down, as may be necessary, and with parts in this relation heat is applied or, with the channel heated from a previous operation, is maintained, for a predetermined length of time sufficient to cure the patch material, and to vulcanize it to the adjacent portions of the tire casing. During this operation, since the tire casing is equally compressed throughout and there is no line of division in the contact of the side plates 2 with the side walls of the tire casing, the contour and curvature of the patch is substantially identical with the contour and curvature of the remainder of the side walls of the tire casing, and consequently when finished cannot be distinguished from the adjacent original portions.

What I claim as my invention is:

1. A mold for use in patching tires, said mold comprising a channel element to accommodate a section of a tire to be patched, said channel element having a bottom and sides, said sides being spaced apart a distance greater than the width of a tire to be patched so that when a section of a tire is disposed in said channel element with its tread resting upon the bottom of said channel element a space exists between at least one side thereof and the adjacent side of said channel element, and a side plate disposed in said space with its outer face against said side of said channel element and its inner face against the side of the tire, the inner face of said plate conforming in contour to the side of the tire and said plate being of a height such that its inner face engages the side of the tire substantially from the tread to a point appreciably above the zone of greatest width of the tire, the inner face of said plate engaging the side only of the tire and the inner face of said side of said channel element being inclined downwardly and inwardly from its top substantially to its bottom and said plate having its outer face correspondingly inclined whereby said plate may be inserted by straight line movement downwardly into said space after the tire section to be patched has been placed in said channel element and whereby insertion of said plate results in the same being urged inwardly against the tire and in the side of the tire being caused to engage snugly against the inner face of said plate due to the downward force exerted upon the tire by the portion of said side plate which engages the tire above its zone of greatest width.

2. A mold for use in patching tires, said mold comprising a channel element to accommodate a section of a tire to be patched, said channel element having a bottom and sides, said sides being spaced apart a distance greater than the width of a tire to be patched so that when a section of a tire is disposed in said channel element with its tread resting upon the bottom of said channel element a space exists between at least one side thereof and the adjacent side of said channel element, and a side plate disposed in said space with its outer face against said side of said channel element and its inner face against the side of the tire, the inner face of said plate conforming in contour to the side of the tire and said plate being of a height such that its inner face engages the side of the tire substantially from the tread substantially to the bead thereof, the inner face of said plate engaging the side only of the tire and the inner face of said side of said channel element being inclined downwardly and inwardly from its top substantially to its bottom and said plate having its outer face correspondingly inclined whereby said plate may be inserted by straight line movement downwardly into said space after the tire section to be patched has been placed in said channel element and whereby insertion of said plate results in the same being urged inwardly against the tire.

3. A mold as set forth in claim 2 including means carried by the channel element for cooperation with the side plate to force the latter downwardly into the space between the side of the tire and the adjacent side of the channel element.

4. A mold as set forth in claim 2 in which both sides of the channel element are of similar construction and in which two side plates of similar construction are employed, one between each side of the channel element and the adjacent side of a section of a tire disposed in said channel element.

JAMES R. RICHARDS.